United States Patent [19]
Karr, Jr.

[11] Patent Number: 5,927,229
[45] Date of Patent: Jul. 27, 1999

[54] VISUAL AID SYSTEM FOR THE HITCH ATTACHMENT OF A MOTOR VEHICLE TO A TRAILER

[76] Inventor: Michael A. Karr, Jr., 9353 Rosstown Way, Houston, Tex. 77080

[21] Appl. No.: 09/078,740

[22] Filed: May 14, 1998

Related U.S. Application Data

[63] Continuation-in-part of application No. 08/638,887, Apr. 25, 1996, which is a continuation-in-part of application No. 08/428,475, Apr. 26, 1995, abandoned.

[51] Int. Cl.⁶ .................................................... B60Q 9/00
[52] U.S. Cl. ........................... 116/28 R; 33/264; 280/477
[58] Field of Search .................... 116/28 R, 30; 33/264, 286, 288; 280/477; 362/84

[56] References Cited

U.S. PATENT DOCUMENTS

| | | | |
|---|---|---|---|
| 357,337 | 2/1887 | Rosenblatt | 403/133 |
| 2,815,732 | 12/1957 | Majors | 116/28 R |
| 2,887,930 | 5/1959 | Zoffmann | 116/63 R |
| 3,015,162 | 1/1962 | Bohnet | 116/28 R |
| 3,858,924 | 1/1975 | Bores | 116/28 R |
| 4,054,302 | 10/1977 | Campbell | 116/28 R |
| 4,313,264 | 2/1982 | Miller, Sr. | 116/28 R |
| 4,546,416 | 10/1985 | Pemberton | 362/84 |
| 4,583,481 | 4/1986 | Garrison | 116/28 R |
| 4,666,176 | 5/1987 | Sand | 33/264 |

FOREIGN PATENT DOCUMENTS

| | | | |
|---|---|---|---|
| 951554 | 7/1974 | Canada | 280/477 |

*Primary Examiner*—Andrew Hirshfeld
*Attorney, Agent, or Firm*—Harrison & Egbert

[57] ABSTRACT

A visual aid system for attachment to a hitch of a motor vehicle to a trailer including a first pole cantably attached onto the hitch connector ball of the motor vehicle and a second pole articulated to the hitch mechanism of the trailer so as to move to a position directly above the socket of the hitch mechanism. The first pole includes a pole member and a receptacle affixed to a lower end of the pole member. The receptacle has a groove formed circumferentially around an interior thereof. An elastomeric band is located within the groove so as to be interposed between the ball and the receptacle. The second pole includes a pole member, an articulatable connector pivotally connected to an end of the pole member, and a base affixed to the hitch mechanism of the trailer. The articulatable connector is pivotally connected to the base. A phosphorescent cap is affixed to a top of the first pole so as to emit light outwardly from an upper portion of the first pole. A phosphorescent cap is affixed to a top of the second pole so as to emit light outwardly from an upper portion of the second pole.

4 Claims, 4 Drawing Sheets

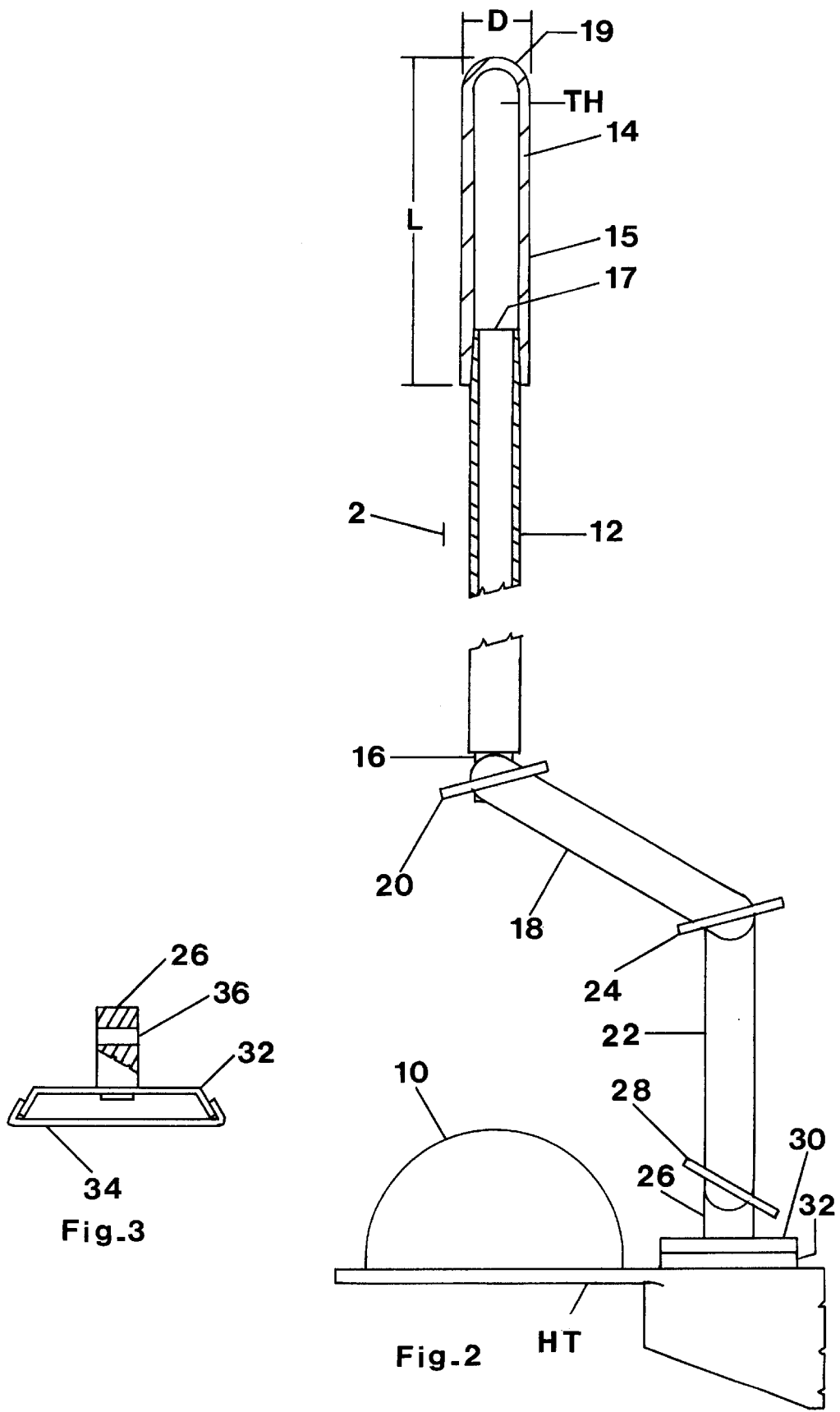

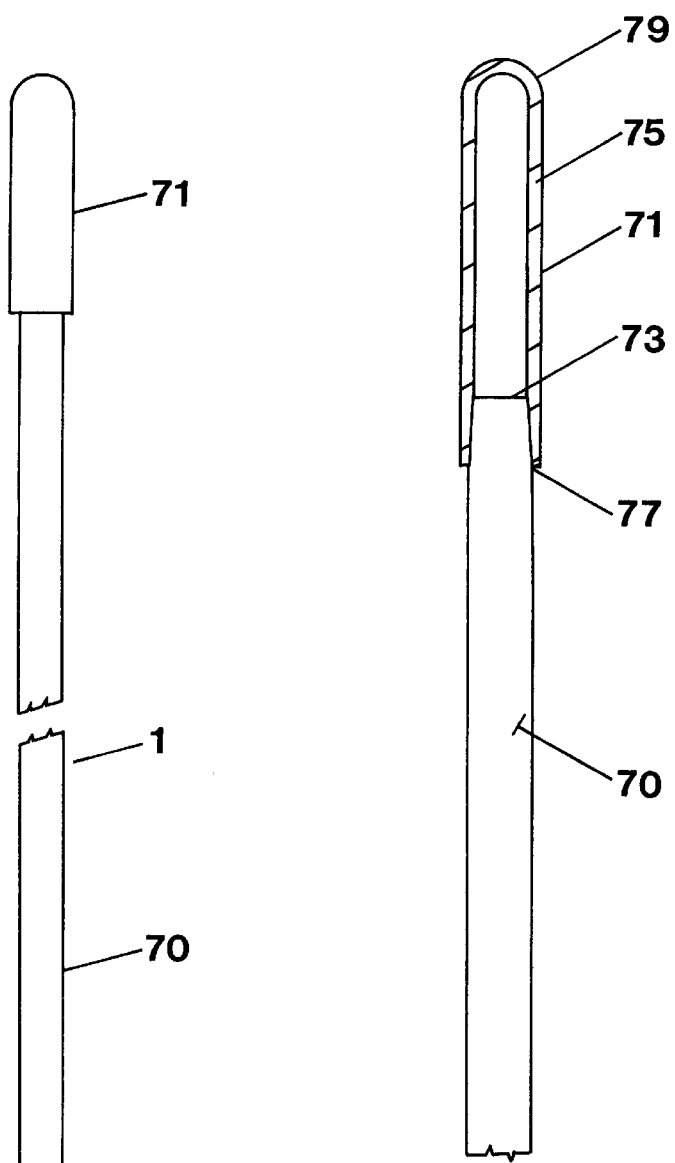
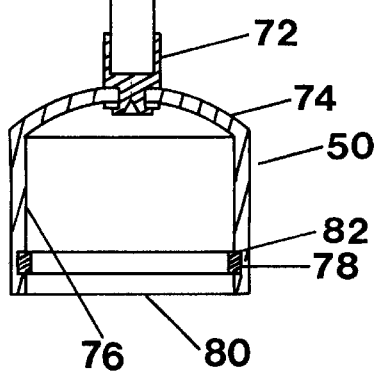

VISUAL AID SYSTEM FOR THE HITCH ATTACHMENT OF A MOTOR VEHICLE TO A TRAILER

RELATED APPLICATION

The present application is a continuation-in-part of U.S. patent application Ser. No. 08/638,887, filed on Apr. 25, 1996, and entitled "VISUAL AID SYSTEM FOR THE HITCH ATTACHMENT OF A MOTOR VEHICLE TO A TRAILER", presently pending. U.S. application Ser. No. 08/638,887 was a continuation-in-part of U.S. patent application Ser. No. 08/428,475, filed on Apr. 26, 1995, and entitled "VISUAL AIDS FOR THE HITCH ATTACHMENT OF A MOTOR VEHICLE TO A TRAILER", now abandoned.

TECHNICAL FIELD

The present invention relates to hitch mechanisms of vehicles. More particularly, the present invention relates to systems which provide a visual aid for aligning a motor vehicle relative to a trailer for the purpose of effecting a hitch connection.

BACKGROUND ART

The guiding of a vehicle for attachment or hook-up to a trailer is usually a tedious, time-consuming and frustrating endeavor. Since such actions are done infrequently, little or no expertise is developed or retained by the person attempting to achieve a quick and easy hook-up. Usually, at least two people are required so as to complete the hook-up. One person is required to manipulate the vehicle and the other person is required to observe and relay guidance information to the vehicle operator. Efforts to carry out this operation at night or under adverse weather conditions further exacerbates this difficulty.

Many thousands of vehicle drivers endure these frustrations and difficulties. In many instances, incorrect attempts at effecting a hitch connection results in vehicle or trailer damage. In some cases, injury to the driver or to persons aiding the driver can occur.

Previous attempts to provide such a visual aid system have been useful, but difficult to use. Ultimately, it is the goal of such a system to provide a visual aid that can be easily installed and easily removed from the hitch mechanism of the trailer and the vehicle. Furthermore, where the visual aid is connected directly to the ball of the hitch connector of the vehicle, it usually only provides an indication of proximity of the socket of the hitch mechanism. It is desirable to provide a visual aid for the ball of the hitch connector of the vehicle which provides a positive indication of the position of the socket directly above the ball. The prior art systems have provided relatively little flexibility in attachment of the visual aids to the vehicle and to the trailer.

These prior attempts to provide such a visual aid system have often employed illumination devices so that the visual aid can be easily viewed in the dark. Each of these illuminating systems would employ batteries, electrical lines, light bulbs, and other electrical apparatus. Commonly, if the visual aid system was stored for a long period of time, the illuminating elements would not operate properly when needed. Often, the batteries would be exhausted, the connections would be corroded, or the light bulb would be broken or inoperative. As such, the visual aid system could not be used when needed the most. As a result, a need has developed so as to provide such a visual aid system which eliminated the need for such electrical illuminating elements.

It is an object of the present invention to provide a device that can be easily used.

It is another object of the present invention to provide a device which serves as a temporarily installed accessory and which can be demounted and stored within the motor vehicle or trailer for subsequent use and reuse.

It is a further object of the present invention to provide a device which is usable under all weather conditions.

It is another object of the present invention to provide a device which is visually perceptible in complete darkness and in brilliant sunshine.

It is a further object of the present invention to provide a device that is of simple, sturdy and reliable construction and which requires no special handling or storage.

It is a further object of the present invention to provide a device which does not require any special skill, training or expertise to install or utilize.

It is another object of the present invention to provide a device which has a very simple observable reaction so as to positively indicate correct alignment and position of the motor vehicle and trailer hitching elements.

It is another object of the present invention to provide a device which is simple and economical to produce.

It is still a further object of the present invention to provide a device that can be effectively used by the vehicle driver without aid by another person.

It is still another object of the present invention to provide a device which performs the intended function and use without subjecting the vehicle driver or aiding persons to a dangerous situation.

It is still another object of the present invention to provide a visual aid system which employs no electrical apparatus for illumination.

These and other objects and advantages of the present invention will become apparent from a reading of the attached specification and appended claims.

SUMMARY OF THE INVENTION

The present invention is a visual aid system for attachment to a hitch attachment of a motor vehicle to a trailer. The motor vehicle has a first pole cantably affixed onto the hitch connector ball of the motor vehicle. The trailer has a second pole articulated to the hitch mechanism of the trailer so as to move to a position directly above the socket of the hitch mechanism. The first pole includes a pole member, and a receptacle affixed to a lower end of the pole member. The receptacle has a notch formed circumferentially around so as to receive an elastomeric band therein. The elastomeric band is interposed between the ball and the receptacle. The receptacle is cantable about the ball upon contact with the hitch mechanism of the trailer.

The second pole comprises a pole member, an articulatable connector pivotally connected to an end of the pole member, and a base affixed to the hitch mechanism of the trailer. The articulatable connector is pivotally connected to the base. The articulatable connector includes a first arm pivotally connected to a lower end of the pole member, and, a second arm pivotally connected to an end of the first arm opposite the pole member. The second arm is pivotally connected to the base at an end opposite the first arm. The base includes a bracket affixed directly on the hitch mechanism, a clip slidably received within the bracket, and a vertical member affixed at one end to the clip. The vertical member is connected to the articulatable connector. The bracket has a slot with a longitudinal axis aligned with the socket of the hitch mechanism. The clip is slidably received within the slot.

A light emitting means is positioned on the first and second poles so as to emit light outwardly from the poles. The light emitting means is affixed at a top of each of the poles. The light emitting means is a cap which is affixed to the top of each of the poles. The cap is formed of a transparent or translucent material which contains a dispersion of a phosphorescent pigment therein. The phosphorescent pigment has the ability to emit light after being exposed to an outside light source, such as the headlamp of a vehicle.

A strip of opaque tape may be affixed to a surface of the mirror in the vehicle so as to face the first and second poles.

BRIEF DESCRIPTION OF THE DRAWINGS

FIG. 2 is an isolated side elevational view of the pole as mounted on the hitch mechanism of the trailer.

FIG. 3 is a detailed view showing the base and clip used to receive the pole onto the hitch mechanism of the trailer.

FIG. 4 is a cross-sectional view of the pole as used on the ball of the hitch connector of the motor vehicle.

FIG. 5 is a partially cross-sectional view of the light emitting means as used on the pole attached to the ball of the hitch connector of the motor vehicle.

DETAILED DESCRIPTION OF THE INVENTION

Figure 1:
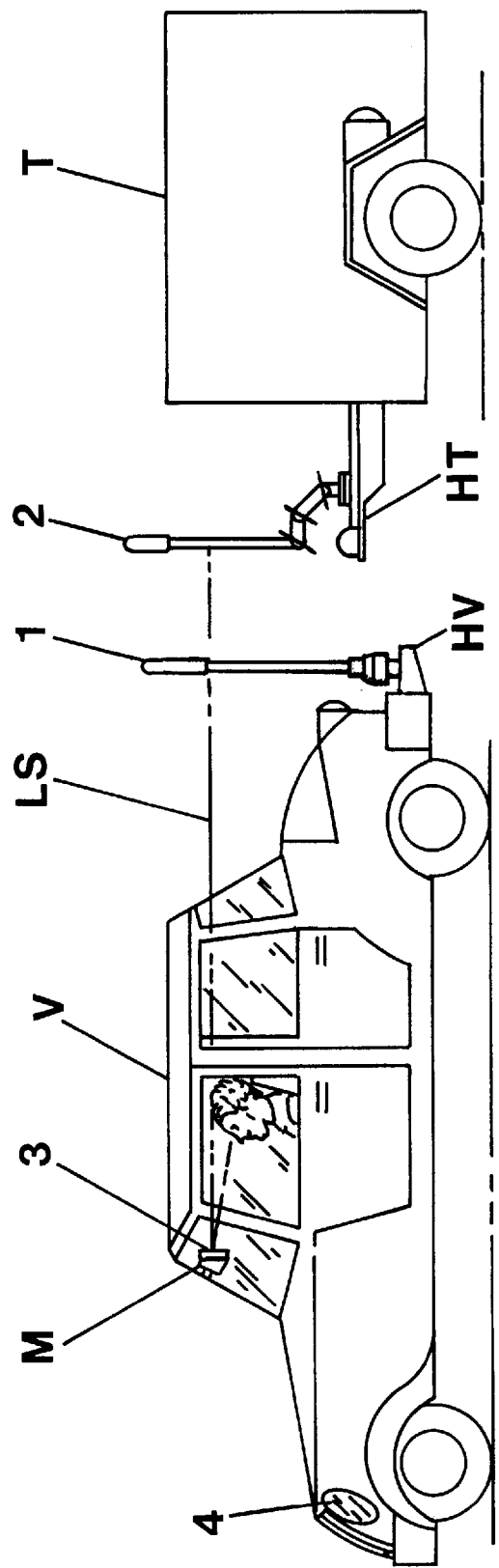
FIG. 1 is a side elevational view of the visual aid system of the present invention as installed on the motor vehicle and trailer.

FIG. 1 illustrates the configuration and operation of the system of the present invention. Initially, it can be seen that a first pole 1 is cantably attached onto the ball of the hitch connector HV of the motor vehicle V. A second pole 2 is articulated to the hitch mechanism HT of the trailer T so as to reside in a position directly above and centralized upon the socket of the hitch mechanism HT.

In order to carry out the operation of the aligning and positioning the vehicle V and the trailer T, the motor vehicle operator driver first adjusts the trailer hitch mechanism HT to an elevation over the height of the motor vehicle hitch mechanism HV and then enters the vehicle and sits in a normal driving position within the vehicle V. The driver directs his attention to the rearview mirror M. The image of the first pole 1 will be in the foreground of his vision. As the driver backs the motor vehicle V towards the trailer T, the driver then observes the relative location of the second pole 2. The second pole 2 is attached to the trailer T and is in the background of the driver's vision. As the vehicle V is maneuvered, the first pole 1 presents the appearance of moving toward or away from alignment with the second pole 2. An opaque tape 3 affixed to the mirror M on the inside of the vehicle V can aid in relating the observable pole positions. As this occurs, the driver adjusts the steering of the vehicle V so as to bring both poles 1 and 2 into alignment. The second pole 2 will be partially or fully obscured by the first pole 1 when the first pole 1 is directly aligned with the second pole 2. When this alignment occurs, the driver can slowly back the vehicle V so as to maintain this alignment. As the trailer T is approaching, the speed of the vehicle V is dimensioned to a "crawl". As the ball of the hitch connector HV of the vehicle V approaches directly below the socket of the hitch mechanism HT of the trailer T, the hitch mechanism HT of the trailer T will touch and angularly displace the first pole on the motor vehicle V. This indicates correct positioning and, as such, it is a visible signal to the driver to stop the vehicle and hold the vehicle's position. The operation is completed by setting the brakes and shutting off the engine. The driver may then effect the actual engagement and locking of the hitch connection by the usual and well known means. Specifically, the trailer T is lowered so as to engage the socket of the hitch mechanism HT with the ball of the hitch connector HV. The locking device is then moved to an appropriate position. Under poor light or other vision impeding conditions, as desired, the light emitting elements of the first pole 1 and the second pole 2 can be activated so as to provide visibility. The light-emitting elements can be activated by exposing them to light from headlamp 4 of the motor vehicle V.

FIG. 2 is an isolated view of the second pole 2 as positioned above the socket 10 of the hitch mechanism HT of the trailer T. As can be seen, the second pole 2 includes a tubular pole member 12 extending vertically upwardly above the top of the socket 10 of the hitch mechanism HT. The pole 12 includes a light-transmitting head 14. The pole 12 is a generally tubular pole. A connector 16 is formed at the bottom of the pole 12 so as to be pivotally connected to a first arm 18. A wingnut 20 serves to secure the connector 16 of the pole 12 in pivotal connection with the first arm 18. The first arm 18 is pivotally connected to a second arm 22. The second arm 22 is connected to the first arm 18 at an end of the first arm 18 opposite the pivotal connector 16 of the pole 12. A wingnut 24 serves to fix the position of the first arm 18 relative to the angular position of the second arm 22. The second arm 22 is pivotally connected to a vertical member 26. The vertical member 26 is positioned at an end of the second arm 22 opposite the first arm 18. A wingnut 28 is provided so as to fix the angular position of the second arm 22 with respect to the position of the vertical member 26. As will be described hereinafter, the vertical member 26 is secured to a clip 30 which slidably resides within a base 32. The base 32 is affixed by screws, adhesives or other means to the surface of the hitch mechanism HT.

The light emitting head 14 includes a cap 15 which is a tubular member affixed to an upper end 17 of the pole 12. The cap 15 has an upper closed end 19. The cap 15 includes a transparent or translucent material in which there is a dispersion of a phosphorescent pigment. In the present case, the term "phosphorescent" means a material having the ability to emit light after being exposed to an outside light (energy) source. For optimum use with the hitching system of the present invention, the ratio of wall thickness ("T"), diameter ("D") and length ("L"): (1) T:D=1:3 through 1:7 inclusive; and (2) D:L=1:4 through 1:9 inclusive. Since the cap 15 is formed of a phosphorescent material, the light source associated with second pole 2 can be activated by placing the cap 15 in proximity to the illuminated head lamp 4 of the motor vehicle V. The phosphorescent material will become luminescent for a suitable period of time so as to allow for the hitching of the trailer T to the motor vehicle V. The phosphorescent material can be stored for a long period of time in the motor vehicle V without losing its ability to become illuminated upon exposure to light. As such, the use of such a phosphorescent cap 15 eliminates the need for electrical apparatus associated with the illuminating of the second pole 2. This allows the pole 2 to be manufactured in an inexpensive manner. The present invention eliminates the need for electrical components which can become corroded or which can become unusable upon exposure to the elements.

FIG. 3 is a detailed view showing how the second pole 2 is removably secured to the hitch mechanism HT. Initially, it can be seen that the base 32 has a flat bottom surface 34 which can be affixed in surface-to-surface contact with a surface of the hitch mechanism HT. The base 32 is a U-shaped member with ends extending angularly inwardly. The clip 30 is received within the ends of the base 32. It can be seen that the clip 30 is a flat member with ends which fit within the ends of the base 32. The second pole 2 is easily installed by the sliding of the clip 30 in the passageway provided in the base 32. The vertical member 26 is affixed centrally on the top surface of the clip 30. A pivot hole 36 extends transversely through the vertical member 26 so as to receive the pivoting mechanism of the second arm 22.

FIG. 4 shows the configuration of the first pole 1. The simplest form of the embodiment of the first pole 1 is shown in FIG. 4. In the simple embodiment, a tubular pole member 70 is received within a socket 72 so as to extend vertically upwardly above a receptacle 50. The receptacle 50 includes a curved top surface extending to the socket 72. Vertical tubular base 76 extends upwardly to the curved surface 74.

Importantly, the interior diameter of the tubular base 76 is sized so as to fit over the outer diameter of a conventional ball of a hitch connector.

So as to facilitate the ability to accommodate variations in the sizes of hitch connector balls and also to facilitate the ability of the first pole 1 to be "cantably" connected to the ball, a groove 78 is formed within the interior of the tubular base 76 and extends circumferentially therearound near the bottom 80 of the receptacle 50. An elastomeric band 82 is fitted within the groove 78. In use, the elastomeric band will be in surface-to-surface contact with the the exterior surface of the hitch connector ball. When a contact occurs between the hitch mechanism of the trailer and the first pole 1, the first pole will cant instead of becoming dislodged because of the interaction of the elastomeric band with the exterior surface of the ball. This unusual effect has been found after experiments with the present invention. In actual use, the "canting" of the first pole 1 with respect to the hitch connector ball provides a better, more positive indication of alignment of the hitch mechanism socket with the hitch connector ball. The use of the elastomeric band assures that the first pole 1 is not completely knocked off of the ball should the maneuvering of the vehicle with respect to the trailer cause the socket to "overshoot" the ball.

In FIG. 4, it can be seen that the pole 70 includes a light-emitting element 71 opposite the receptacle 50. FIG. 5 shows such a light-emitting element 71 in cross-sectional view. It can be seen that the light-emitting element 71 is affixed onto the top end 73 of pole 70. Pole 70 is of a tubular configuration. The light-emitting element 71 is a cap 75 which includes an opening 77 at one end. The end 73 of pole 70 is inserted into opening 77. The end 73 of pole 70 has a locking taper thereon. As such, the cap 75 will engage the end 73 of pole 70 in a tight friction-fit manner. Adhesives, and other materials, may also be used so as to securely join the cap 75 onto the end 73 of pole 70.

The cap 75 has a closed end 79 opposite open end 77. The cap 75 is formed of a transparent or translucent material in which there is a dispersion of phosphorescent pigment. The term "phosphorescent" has been defined herein previously. The cap 75 will have the dimension ratios in the ranges described herein previously in association with the cap 15 shown in FIG. 2. The light-emitting element 71 can be illuminated by simply exposing the light-emitting element 71 to light from the head lamp 4 of the motor vehicle V. As such, the first pole 1 can be easily stored for a longer period of time without any fear of corrosion, loss of illumination capacity, or damage from exposure to the elements. As such, the first pole 1 can be manufactured in a very inexpensive manner. No special skills or required for illuminating the first pole 1.

Figure 6:
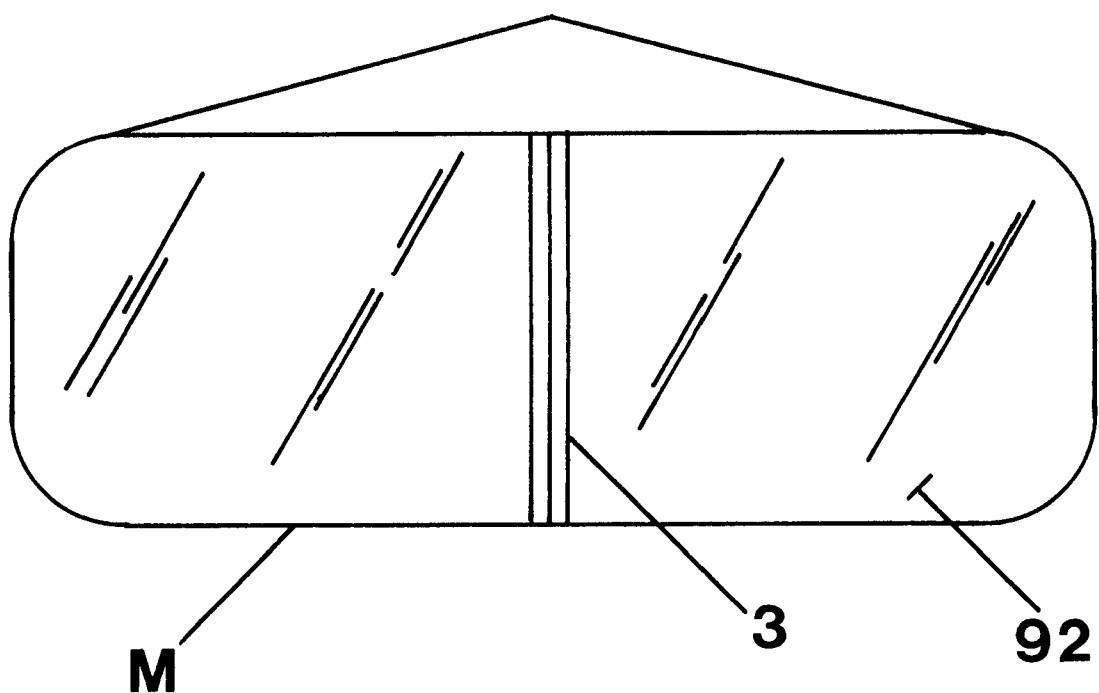
FIG. 6 is a frontal view showing the mirror as used on the interior of the motor vehicle.

FIG. 6 is an isolated view of the mirror M as used on the interior of the motor vehicle. The mirror M includes a reflective surface 92 with a strip of opaque tape 3 placed in the approximate center of the reflective surface 92 and in a vertical position. The opaque tape 3 may remain in place or may be removed and retained after its initial use, depending upon the desires of the user.

The present invention offers many advantages. First, it permits the hitch connection to be easily accomplished by an unaided driver of the motor vehicle. No exceptional driving skills or training are required. The application and installation of the system can be accomplished without any tools. The tubular poles used with the present invention are of a simple and rugged design so as to make them resistant to poor handling, storage or use. The poles of the present invention area easily stored and maintained. The devices are discernible under adverse lighting and weather conditions so as to make them usable at any time.

Though the present invention is more specifically intended for use on a motor vehicle and trailer hitch connections, the present invention should not be construed or limited to such connections. Various sizes, shapes, materials and mounting configurations and schemes are possible within the scope of the present invention. The principles of use for the invention can also be applied to other similar alignments and position needs. For example, the invention can be useful in aligning and positioning a farm tractor for attachment to cultivation equipment. This device can also extend into many other industrial and commercial fields.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A visual aid system for attachment to a hitch attachment of a motor vehicle to a trailer, the system comprising:
   a hitch connector ball;
   a hitch mechanism with a socket connectable to the hitch connector ball;
   a first pole cantably affixed onto the hitch connector ball; and
   a second pole articulated to the hitch mechanism so as to reside in a position directly above the socket of the hitch mechanism, said second pole comprising:
      a pole member; and
      an articulatable connector pivotally connected to an end of said pole member; and
      a base affixed to said hitch mechanism, said articulatable connector being pivotally connected to said base, said articulatable connector comprising:

a first arm pivotally connected to a lower end of said pole member; and a second arm pivotally connected to an end of said first arm opposite said pole member, said second arm pivotally connected to said base at an end opposite said first arm.

2. The system of claim 1, said articulatable connector further comprising:

a means for fixing a position of one of said arms with respect to the other of said arms and with respect to said pole member and said base.

3. The system of claim 1, said base comprising:

a bracket affixed directly on said hitch mechanism;

a clip slidably received within said bracket; and a vertical member affixed at one end to said clip, said vertical member being connected to said articulatable connector.

4. The system of claim 3, said bracket having a slot with a longitudinal axis aligned with said socket of said hitch mechanism, said clip being slidably received within said slot.

* * * * *